(12) United States Patent
Sullivan et al.

(10) Patent No.: US 11,663,634 B2
(45) Date of Patent: May 30, 2023

(54) ONLINE MEDIA DISTRIBUTION AND TRACKING FRAMEWORK FOR STREAMING VIDEO DISSEMINATION TO CONSUMERS

(71) Applicant: Clix, Inc., Venice, CA (US)

(72) Inventors: Edward M. Sullivan, Marina Del Rey, CA (US); Eric Januszko, Carlsbad, CA (US); Patricia Sullivan, Marina Del Rey, CA (US)

(73) Assignee: Clix, Inc., Venice, CA (US)

( * ) Notice: Subject to any disclaimer, the term of this patent is extended or adjusted under 35 U.S.C. 154(b) by 0 days.

(21) Appl. No.: 17/315,301

(22) Filed: May 8, 2021

(65) Prior Publication Data

US 2021/0350421 A1   Nov. 11, 2021

Related U.S. Application Data

(60) Provisional application No. 63/022,291, filed on May 8, 2020.

(51) Int. Cl.
| | |
|---|---|
| *G06Q 30/02* | (2023.01) |
| *H04L 65/75* | (2022.01) |
| *H04L 65/612* | (2022.01) |
| *G06Q 30/0241* | (2023.01) |
| *G06Q 30/0242* | (2023.01) |
| *G06Q 30/0201* | (2023.01) |

(52) U.S. Cl.
CPC ..... *G06Q 30/0277* (2013.01); *G06Q 30/0201* (2013.01); *G06Q 30/0242* (2013.01); *H04L 65/612* (2022.05); *H04L 65/75* (2022.05)

(58) Field of Classification Search
CPC .................................. G06Q 30/0207–30/0277
USPC ..................................................... 705/14, 319
See application file for complete search history.

(56) References Cited

U.S. PATENT DOCUMENTS

| | | |
|---|---|---|
| 2004/0122735 A1 | 6/2004 | Meshkin |
| 2007/0027765 A1* | 2/2007 | Collins .............. G06Q 30/0257 705/14.71 |

(Continued)

OTHER PUBLICATIONS

WIPO, PCT Form ISA210, International Search Report for PCT/US2021/031455, pp. 3 (dated Aug. 10, 2021).

(Continued)

*Primary Examiner* — Waseem Ashraf
*Assistant Examiner* — Richard G Reinhardt
(74) *Attorney, Agent, or Firm* — UltimatEdge IP Law Group, P.C.; Dean G. Stathakis

(57) ABSTRACT

A framework for online media distribution of media content that includes streaming video, and tracking of the media content and consumer engagement with the streaming video, is configured to disseminate programs that include media content for display on a publisher site, where the streaming video is embedded thereon. The framework allows consumers to interact with advertisers by engaging with the media content directly. The framework also enables video streaming capabilities on any affiliate network that connects publishers and advertisers, so that the distribution of media content is agnostic and independent of the affiliate networks' platforms. The framework reconciles all actions in such an end-to-end journey by integrating syntaxes of different systems from consumer to advertiser.

20 Claims, 2 Drawing Sheets

(56) References Cited

U.S. PATENT DOCUMENTS

2009/0282433 A1* 11/2009 Petta ................. H04N 21/8586
                                                    725/32
2011/0106622 A1   5/2011 Kuhlman et al.
2011/0106631 A1* 5/2011 Lieberman ......... G06Q 30/0241
                                                    715/843
2012/0054278 A1*  3/2012 Taleb ..................... H04W 4/21
                                                    709/204

OTHER PUBLICATIONS

WIPO, PCT Form ISA237, Written Opinion for PCT/US2021/031455, pp. 6 (dated Aug. 10, 2021).

* cited by examiner

ONLINE MEDIA DISTRIBUTION AND TRACKING FRAMEWORK FOR STREAMING VIDEO DISSEMINATION TO CONSUMERS

This application claims the benefit of priority and is entitled to the filing date pursuant to 35 U.S.C. § 119(e) of U.S. Provisional Patent Application 63/022,291, filed May 8, 2020, the content of which is hereby incorporated by reference in its entirety.

FIELD

The present invention relates to the field of Internet-based advertising. Specifically, the present invention relates to an approach in which distribution of media content is seamlessly integrated between affiliate networks, advertisers, and publishers.

BACKGROUND

There are many existing approaches to connecting affiliate networks as marketers to advertiser display offers involving media content across disparate online networks involved in such Internet-based advertising. Currently, advertisers interact directly with consumers, and existing approaches do not enable continued participation of affiliate networks or publishers. One issue with such approaches is that they are not agnostic as to the affiliate network or the advertiser in a manner that enable seamless insertion of publisher content using a common syntax between such disparate networks.

Current approaches proffer still images on publisher sites of the display offer with embedded links to advertiser sites. When a user clicks on a display offer they are directed to a third party point of sale site to view or buy products or services. There is currently no approach in which streaming of video content with embedded links to advertiser sites is offered to the publisher from the affiliate marketers' sites.

Still further, there is no existing approach that enables integration of networks using a common syntax, and insertion of streaming video content within such a common syntax, that enables end-to-end tracking of user engagement with the streaming video content through to interaction with a merchant or advertiser to provide for proper attribution of rewards, credits, payments, and other such elements between the various parties involved in Internet-based advertising.

Accordingly, there is a need in the existing art for an approach that enables both end-to-end integration of different networks involved in Internet-based advertising and proper attribution among all parties when a consumer and a merchant interact to conduct a transaction, as well as enabling the involvement of publishers in a seamless manner between affiliate networks and merchants. More specifically, there is also a need in the existing art for an approach that enables streaming video to be viewed on a publisher site with embedded links to the point-of-sale site, and a further need in the existing art for an approach that enables consumers to interact with streaming video and to connect them directly with advertisers, across the disparate, affiliate networks that may be involved. There is still a further need in the existing art for an approach which tracks a consumer's entire journey from the initial interaction with streaming video, through to the click-through that carries them to the advertiser point of sale site.

BRIEF SUMMARY

The present invention addresses these needs by providing a proprietary approach to distribution of media content that connects advertisers and publishers over affiliate networks, where the media content includes video content at least in the form of streaming video. The present invention is an online media distribution and tracking framework for such streaming video, within which consumers interact with advertisers by engaging with the media content directly. Such a framework drives more engagement between advertisers and consumers, more sales conversion, and enables a more effective promotion of products and services.

The framework also enables video streaming capabilities across different affiliate networks that connect publishers and advertisers. Affiliate networks are Internet-based systems that act as an intermediary between publishers and advertisers, and allow websites to more easily find and participate in programs which are suitable for their website and which generate income. Such programs are arrangements through which the advertiser pays a fee to a publisher for the action of generating clicks, sales or leads from links located on that publisher's website. The present invention enables video streaming across any such affiliate network, such that the distribution of media content is agnostic and independent of the affiliate networks' platforms.

The present invention also provides an approach for tracking and monitoring a consumer's end-to-end experience, from watching a video on a publisher's site to the click-through to the advertiser's site, and the purchase of products, that enables both attribution and engagement tracking for the media content. The present invention assigns a unique identifier to each consumer in the form of at least one tracking signature such as a hash or a token; as the consumer clicks or navigates through, this unique identifier is passed from end to end, and enables the online media distribution and engagement tracking framework to reconcile actions across that journey from publisher to affiliate network to advertiser.

In one aspect thereof, the present invention is embodied at least in a process comprised of a plurality of steps. These steps include generating video content for an online advertising campaign that at least includes a streaming video file, where the advertising campaign is provided by or requested by an associated advertiser, and generating a call-to-action still associated with the streaming video file. The process further includes embedding one or more portions of software code that include one or more program instructions in the streaming video hosting site, where the one or more portions of software code include the call-to-action still, at least one tracking mechanism for attributing benefits, and a mechanism such as the at least one tracking signature such as a hash or a token for identifying a consumer via a publisher site, and directing a display of the advertising campaign on the publisher site. The process also includes presenting the call-to-action still at or near the end of a playback of the streaming video file, tracking the consumer's interaction with the video streaming file, and the call-to-action still, and directing the consumer to an advertiser site via the call-to-action still. The process may also include communicating a report of consumer interaction with the streaming video file to the associated.

It is therefore one objective of the present invention to provide a system and method of enabling improved interaction between a consumer and an advertiser in an online networking and marketing environment. It is another objective of the present invention to enable tracking of consumer interactions with advertising campaigns in such an online network and marketing environment, and directing consumers to advertisers associated with such campaigns via interactions video content therein. It is still another objective of the present invention to provide links to streaming video files to embed on publisher sites, and tracking consumer interactions with those streaming video files.

It is another objective of the present invention to provide a system and method of offering advertising programs containing video content to consumers on behalf of advertisers, while being agnostic as to affiliated networks. It is a further objective of the present invention to provide a system and method of media distribution in which the syntax of different systems of publishers, advertisers, and affiliates is matched and integrated for providing such advertising programs. It is still further an objective of the present invention to provide a system and method of offering advertising programs containing video content to consumers as a publishing entity, that is also agnostic as to affiliated networks.

Other objects, embodiments, features and advantages of the present invention will become apparent from the following description of the embodiments, taken together with the accompanying drawings, which illustrate, by way of example, the principles of the invention.

BRIEF DESCRIPTION OF THE DRAWINGS

The accompanying drawings, which are incorporated in and constitute a part of this specification, illustrate aspects of the disclosed subject matter in at least one of its exemplary embodiments, which are further defined in detail in the following description. Features, elements, and aspects of the disclosure are referenced by numerals with like numerals in different drawings representing the same, equivalent, or similar features, elements, or aspects, in accordance with one or more embodiments. The drawings are not necessarily to scale, emphasis instead being placed upon illustrating the principles herein described and provided by exemplary embodiments of the invention. In such drawings.

DETAILED DESCRIPTION

In the following description of the present invention, reference is made to the exemplary embodiments illustrating the principles of the present invention and how it is practiced. Other embodiments will be utilized to practice the present invention and structural and functional changes will be made thereto without departing from the scope of the present invention.

Affiliate networks provide Internet-based intermediary marketing services in which a business, such as a merchant or an advertiser, rewards one or more affiliates for each visitor or consumer brought by the affiliate's own marketing efforts. Publishers create advertising content on behalf of the advertisers for distribution over such affiliate networks. The present invention is an online media distribution and tracking framework over which advertisers, publishers are connected via one or more of such affiliate networks for the purpose of disseminating video content to consumers in a network-based computing environment. The online media distribution and tracking framework, which may also be referred to herein as ClixDirect, includes a video dissemination platform that may act as a content generation platform, a content viewing platform, and a content crossover platform, depending on the configuration of the framework. Regardless of the configuration, the video dissemination platform (or, the ClixDirect platform) generates at least a call-to-action (CTA) still that is associated with video content, and which carries embedded code that at least includes consumer-specific tokens and provides a common syntax that links consumers, publishers, and advertisers over such affiliate networks.

Figure 1:
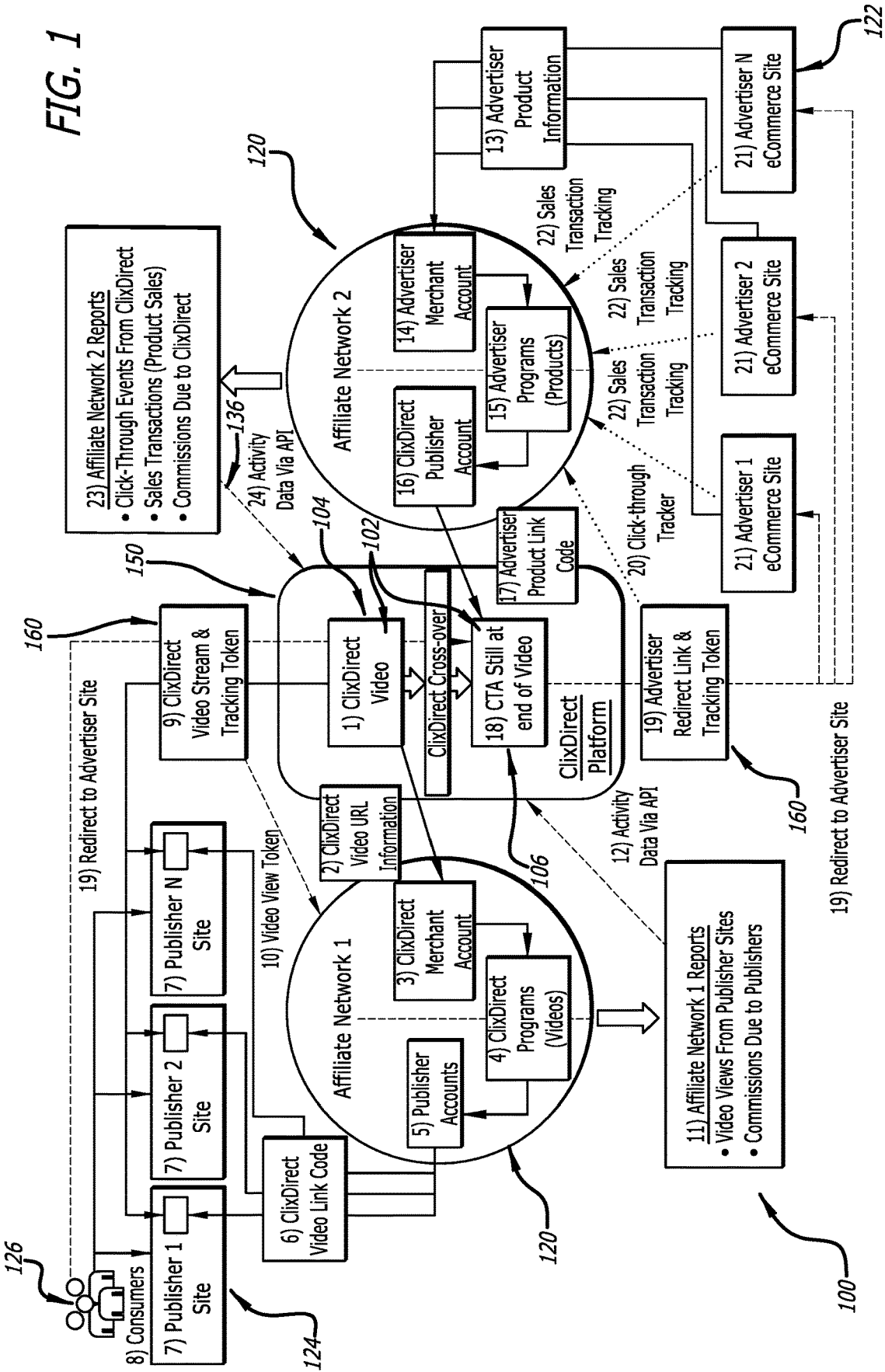
FIG. 1 attached is an architecture diagram illustrating components of an online media distribution and tracking framework, according to one or more embodiments of the present invention.

FIG. 1 is a schematic diagram of the online media distribution and tracking framework 100 according to the present invention. The online media distribution and tracking framework 100 includes one or more approaches to connecting advertisers 122 with publishers 124 and across different affiliate networks 120, in which media content 102 is disseminated via a proprietary content generation and distribution platform 150. The online media distribution and tracking framework 100 also acts as a mechanism for managing advertising programs in an online marketing environment, and for tracking the media content 102 across the entire online marketing environment comprising the affiliate networks 120, advertisers 122, and publishers 124 for both an end-to-end attribution of rewards and benefits as the media content 102 is distributed across all segments of the online marketing environment, and for tracking a consumer engagement with the media content 102.

The online media distribution and tracking framework 100 is performed in conjunction with, and operates within, a computing environment 130 (not shown) in which one or more processors 132 (not shown) and a plurality of software and hardware components may be configured to execute program instructions or routines to perform the functions of the data processing elements 134 (not shown) described herein and embodied in one or more algorithms to link advertisers 122 with publishers 124 using affiliate networks 120 in such an online marketing environment with consumers 126 throughout the distribution and consumption process of media content 102 such as streaming video 104. These algorithms are part of the proprietary content generation and distribution platform 150 that embodies the online media distribution and tracking framework 100, in which one or more systems and methods are performed by applying mathematical functions, models or other analytical and data processing techniques that ensure a seamless integration of multiple marketing and media partners, and reconciliation of actions involved in such an end-to-end distribution and consumption process.

In media creation and distribution involving Internet-based computing networks, programs are arrangements through which advertises 122 pay a fee, often referred to as business rewards, to publishers 124 when clicks, sales or leads are generated from consumers 126 via links located on that publisher's website. As noted above, an affiliate network 120 is a system that acts as an intermediary between publishers 124 (such as individuals or companies that market the advertiser product through their website) and advertisers 122 (such as vendors, merchants, product creators, or retailers with a product to market).

The online media distribution and tracking framework 100 is configured to disseminate programs comprising media content 102 for display on the publisher website, where the media content 102 is, for example, streaming video 104 contained within one or more files for such streaming video. The online media distribution and tracking framework 100 may also be configured to act on behalf of advertisers and permit upload and storage of media content 102 such as streaming video 104 on servers associated with the ClixDirect platform, and/or generate such media content 102 itself. The online media distribution and tracking framework 100 alternatively may be configured to enable viewing of the media content 102, as a publisher of such content 102, and may further be configured to act as an advertising program manager in a crossover that connects consumers 126 and advertisers 122 via other publishers 124 and affiliate networks 120. Each of these configurations are explained in more detail below.

In one embodiment of the present invention, and referring to FIG. 1, a sequence of activities in a process for performing the online media distribution and tracking framework 100 is indicated using numerals in parentheticals. In this embodiment, programs comprising video content 104 are offered to publishers 124 where the online media distribution and tracking framework 100 is utilized to act on behalf of the advertiser 122 itself. Advertisers 122 may engage with the present invention to create media content 104 on its behalf (1), together with associated call-to-action (CTA) stills 106, as part of advertising campaigns where the content generation and distribution platform 150 acts as the publishing entity, or may provide the media content 102 themselves directly. Regardless, the media content 102 portion and the CTA still(s) 106 of the advertising campaign are uploaded to the ClixDirect content generation and distribution platform 150, either from the third-party advertisers 122 or from an internal content generation module. The online media distribution and tracking framework 100 then associates the advertiser's streaming video content 104 and CTA still 106, by embedding software in the streaming video 104 that enables characteristics such as tracking signatures such as hashes or tokens 160, and other click-through tracking elements or codes, regardless of the author of the video content 104 itself.

In such an arrangement, the online media distribution and tracking framework 100 generates a URL (2) and associated information for the streaming video 104 of the media content 102 for each advertising campaign, and the campaign's video URL information is entered into the merchant account that is created for the merchant or advertiser 122 on whose behalf the campaign is created. The merchant account is logged (3) with a first affiliate network 120, and the online media distribution 124 and tracking framework 100 creates one or more programs for publishers 124 for dissemination of the online advertising campaign. These programs are offered for publishers to join (4) on the first affiliate network 120.

Publishers 124 then the join programs through publisher accounts (5) on the first affiliate network 120. Publishers 124 retrieve one or more video link codes that are provided through the first affiliate network 120 at (6), and embed the video link code(s) (7) on their respective sites. Any number of publishers 124 may be involved, and it is to be understood that video links and representative tracking elements or codes may be assigned to individual publishers or groups of publishers 124, such that there may be one or many video links and tracking elements or codes associated with a particular advertising campaign.

Tracking of consumer's journey begins when the consumer 126 visits (8) a publisher's site, and accesses the streaming video 104 by clicking a play button (or, otherwise interacting with the link that accesses a file containing the streaming video 104, such as by touch or voice) to watch the embedded media content 102 therein. The streaming video 104 is streamed from the ClixDirect content generation and distribution platform 150 to the embedded iFrame on the publisher's site. When the streaming video 106 completes its play, the consumer is redirected through the ClixDirect content generation and distribution platform 150 to the CTA still 106 that is presented at the end of the playback of the file (18) containing the streaming video 104.

When a consumer 126 clicks on, or otherwise interacts with, embedded media content 102 that includes streaming video 104, a consumer identifier in the form of a tracking signature such as hash or token 160 is generated that is unique to that consumer 126. Such a hash or token 160 may be based, for example, on a timestamp generated at the time the consumer 126 plays the video, a browser cookie deployed to the consumer's web browser to track the user 126, an Internet protocol (I P) address of the browser or device, or other device-specific or browser specific tracking code that is capable of identifying the consumer 126 without including any personal identifiable information (PII) to remain compliant with privacy regulations. The consumer identifier is associated with a link to the streaming video 104 at (9) by embedding the tracking signature (such as hash or token 160) within the link. The tracking hash or token posts back to the first affiliate network 120 at (10), for example after a number of seconds that was pre-specified on the ClixDirect content generation and distribution platform 150 when the media content 102 was created, to record that a view of the streaming video 104 has occurred from the publisher's site. The hash or token 160 comprising the consumer identifier may also include a component that identifies the particular publisher 124 on whose site the streaming video 104 was accessed.

It is to be understood that the tracking signature representing the consumer identifier may be either a hash, a token, or any other output of an algorithm-based function used to generate such a tracking signature. Tracking signatures may, for example, be strings of characters representing a hash value or a key that unique represent each consumer. Regardless of the type of tracking signature generated, the character strings may be stored in a lookup table within the framework 100 that can be retrieved when authentication of the tracking signature is required as the media content 102 progresses through the online marketing environment. The hash or token shall be referred to herein as a token, but it is to be understood that such a token may refer to any character string or other algorithm-generating value that may be used to securely identify a consumer 126.

The first affiliate network 120 then updates a report of system activity (11) and communicates this information back to the ClixDirect content generation and distribution platform 150 to reflect that video view activity occurred from one or more publisher sites. Additionally, the activity data regarding the video view includes other information that may be useful, and therefore the online media distribution and tracking framework 100 provides that such activity data may be accessed, for example from the first affiliate network 120 at (12) via one or more application programming interfaces (APIs). Such activity data may also be stored in a database collection for further normalization, reconciliation and reporting. Examples of such activity data include the length of time the streaming video 104 was accessed, the number of times it was accessed, backward and forward actions of the consumer in viewing the streaming video 104, the location (such as city, state or country) from which it was accessed, language settings of the consumer 126, the browser and/or operating system that was used to access the streaming video 104, and the type of device used to access the streaming video 104 (such as a mobile phone, a smartwatch, a virtual reality headset, a television, etc.).

In another embodiment of the present invention, and again referring to FIG. 1, advertiser-generated programs that include media content 102 such as product pictures, graphics, URLs, and associated information for their products are made available for purchase (13) from their respective e-commerce sites (21) over a second affiliate network 120. In such an embodiment, the online media distribution and tracking framework 100 acts as the publisher 124 of such media content 102, and may join different advertiser programs as a consumer cross-over and connection platform.

As publisher 124, the online media distribution and tracking framework 100 enables creation of advertiser merchant accounts, which allow advertisers 122 to enter product information and URLs in their merchant account on the second affiliate network 120 at (14). Advertisers 122 then offer their programs for publishers 124 by linking directly to the ClixDirect content generation and distribution platform 150 of the online media distribution and tracking framework 100 on the second affiliate network 120 at (15) over which the streaming video 104 is accessible. A publisher account is created on the second affiliate network 120 at (16), and advertiser programs are joined under this publisher account.

Via the ClixDirect content generation and distribution platform 150, the advertiser's product link code provided through the second affiliate network 120 is retrieved (17) and entered into a CTA still 106 at (18) that is presented at the end of the streaming video 104.

In addition to acting as publisher 124 itself, the online media distribution and engagement tracking framework 100 may also serve as a consumer crossover and connection mechanism. When the playback of the streaming video 104 is completed, the consumer 126 is presented with the CTA still 106. When the consumer 126 clicks on or otherwise interacts with the CTA still 106, they are redirected to the advertiser's e-commerce site (19) via the product link provided via the ClixDirect content generation and distribution platform 150 as noted above. This serves as an advertiser re-direct link, which may also be associated with the signature token 160 comprising the consumer identifier embedded within the link to the video streaming file as described above.

The advertiser re-direct serves as a click-through tracker that posts back to the system of the second affiliate network 120 at (20) to record that the consumer 126 clicked on the CTA still 106 and was redirected to the e-commerce site of the advertiser 122. The click-through tracker also records that the ClixDirect content generation and distribution platform 150 is the referring publisher 124 or source. The consumer 126 is then redirected to the e-commerce site of the advertiser 122 at (21) after clicking on the CTA still 106, so that the consumer 126 can purchase products of the advertiser 122.

The consumer identifier and associated tracking signature (such as a hash or token 160) may also act as a tracking element or code for tracking sales transactions in such a click-through tracker. Regardless, when a consumer 126 completes a purchase from an e-commerce site of an advertiser 122, the framework 100 posts back to the second affiliate network's system 120 at (22) to record that a purchase has occurred, including the sales transaction data and commission amount. The framework 100 also records that the ClixDirect content generation and distribution platform 150 is the referring publisher 126 who is owed the commission. The second affiliate network 120 also updates its system activity reports available to the ClixDirect content generation and distribution platform 150 to (22) to reflect the click-through and sales transaction activity from the advertiser sites. It should be noted, however, that the click-through tracker that records purchases may also be a character string or other identifying piece of code that is generated and provided separate from the token 160 used as a consumer identifier.

Access to the framework 100 of the present invention may be provided through one or more application programming interfaces (APIs) 136. The present invention contemplates that many layers of such APIs 136 may be utilized within the framework 100, for example to enable ingest of particular forms of input data from affiliate networks 120, advertisers 122, or publishers 124, or customized uses of output data generated therefrom. APIs 136 may be managed by an API element specifically configured for each implementation thereof, for example to ensure that intake of certain types of information that require a particular format or conversion from a particular format is seamlessly integrated. APIs 136 may also be utilized for other functions within the framework 100, such as to enable messaging within the framework 100, for example to communicate real-time operational messages or status messages. APIs 136 may also be utilized for monitoring of activities occurring during an online advertising campaign, for example of an operational status or for real-time attribution of benefits.

A further layer of APIs 136 may be provided for output data, such that one or more APIs 136 may be developed to enable the follow-on uses of information generated by the framework 100, such as to generate and export customized reports or develop enterprise-specific applications. APIs 136 may also be provided to enable customized interfaces via support sites for each participant in the online marketing environment.

As with the embodiment where the online media distribution and tracking framework 100 acts as the advertiser in generating media content 102 as streaming video 104, activity data regarding the streaming video view may be pulled from the second affiliate network 120 via one or more of such APIs (24). The ClixDirect content generation and distribution platform 150 pulls the click-through and sales transaction activity data from the second affiliate network's system via an API, and stores the data in a database collection for further normalization, reconciliation and reporting, as above. Similarly, many examples of such activity data are possible, and within the scope of the present invention.

As noted above, the online media distribution and tracking framework 100 enables an end-to-end management of the consumer's journey vis-à-vis an advertising campaign, using one or more tracking signature tokens 160 and CTA stills 106, which are code or portions thereof embedded in streaming video 104. A consumer's journey may be triggered by interacting with the streaming video 104, for example by clicking on a window or other area denoted on a graphical user interface to initiate playback of streaming video.

It is to be understood that the act of clicking on such media content 102 is but one method that can trigger tracking of the consumer's journey. For example, a consumer 126 may interact with the media content 102 via touch capabilities, by tapping or pressing directly onto the area of their screen where a content window appears. Alternatively, the consumer 126 may tap or press a pop-up window or box that links to the streaming video 104, for example where the window or box poses a question to the consumer as to whether they want to view the streaming video 104. Consumers 126 may also interact with the streaming video 104 by issuing voice commands that instruct the publisher 124 to play the streaming video 104. It is therefore to be further understood that the present invention contemplates that many methods exist for a consumer 126 to interact with media content 102, and that the present specification is not to be limited to any one type of interaction expressed or discussed herein.

It is to be further understood that the publisher sites are not to be limited to Internet-based websites. For example, a publisher 124 may be a television program, where such a television program is viewable on a device that has interactive capabilities. In such a scenario, where product placement appears on a television program, viewers may be invited to watch streaming video 104 about that product placement. The online media distribution and tracking framework 100 of the present invention then manages such interactions via the ClixDirect content generation and distribution platform 150.

The online media distribution and tracking framework 100 is provided, in one embodiment of the present invention, a system comprised of multiple hardware and software elements that are each configurated to perform some aspect of the framework 100. For example, the online media distribution and tracking framework 100 may include a campaign generation element that is configured to initialize an online advertising campaign within the web-based marketing environment, in a content generation and distribution platform 150 at or configured with a publishing site 124.

In such an embodiment, the online media distribution and tracking framework 100 may further include a network integration element that is configured to integrate a networking syntax at least between the one or more affiliate networks 120 and the publishing site 124, and between the publishing site 124 and the associated advertiser 122, and integrate a transmission syntax between the one or more affiliate networks 120 and the advertiser 122 to allow for communication of tracking information relative to the media content 102 between one or more affiliate networks 120 and the advertiser 122. Such integration aspects of the framework 100 may be accomplished by compiling a plurality of program instructions governing a distribution of the online advertising campaign within the web-based marketing environment, where the program instructions comprise one or more algorithms that match both the networking syntax and the transmission syntax between network elements.

The networking integration element may also include a tracking element configured to insert tracking information relative to the media content 102 into the file or files containing the streaming video 104. Such tracking information may include a content adaptor for adapting the media content 102 to the one or more affiliate networks 120 and the advertiser 122 and enable an end-to-end attribution of benefits relative to a distribution of the media content 102 between the one or more affiliate networks 120, the publishing site 124, and the advertiser 122. The tracking information further includes the consumer identifier, for example the least one tracking signature token 160, which is associated with the content adaptor and configured to track consumer interactions with one or both of the streaming video 104 and the call-to-action still 106 within the web-based marketing environment.

The online media distribution and tracking framework 100 may further include a campaign execution element that is configured to provide the online advertising campaign to the web-based marketing environment. Such a campaign executing element initiates a delivery of the online advertising campaign from the content generation and distribution platform 150 within the web-based marketing environment.

When the streaming video 106 is presented to the consumer 126, at or near the end of a playback of the streaming video 104, the call-to-action still 106 is activated and presented to the consumer 126. The campaign execution element may also detect the consumer's interaction with one or both of the streaming video 104 and the call-to-action still 106, and direct the consumer 126 to the merchant or advertiser site 122 while maintain the tracking protocols for both reward attribution and consumer engagement throughout the online advertising campaign.

Figure 2:
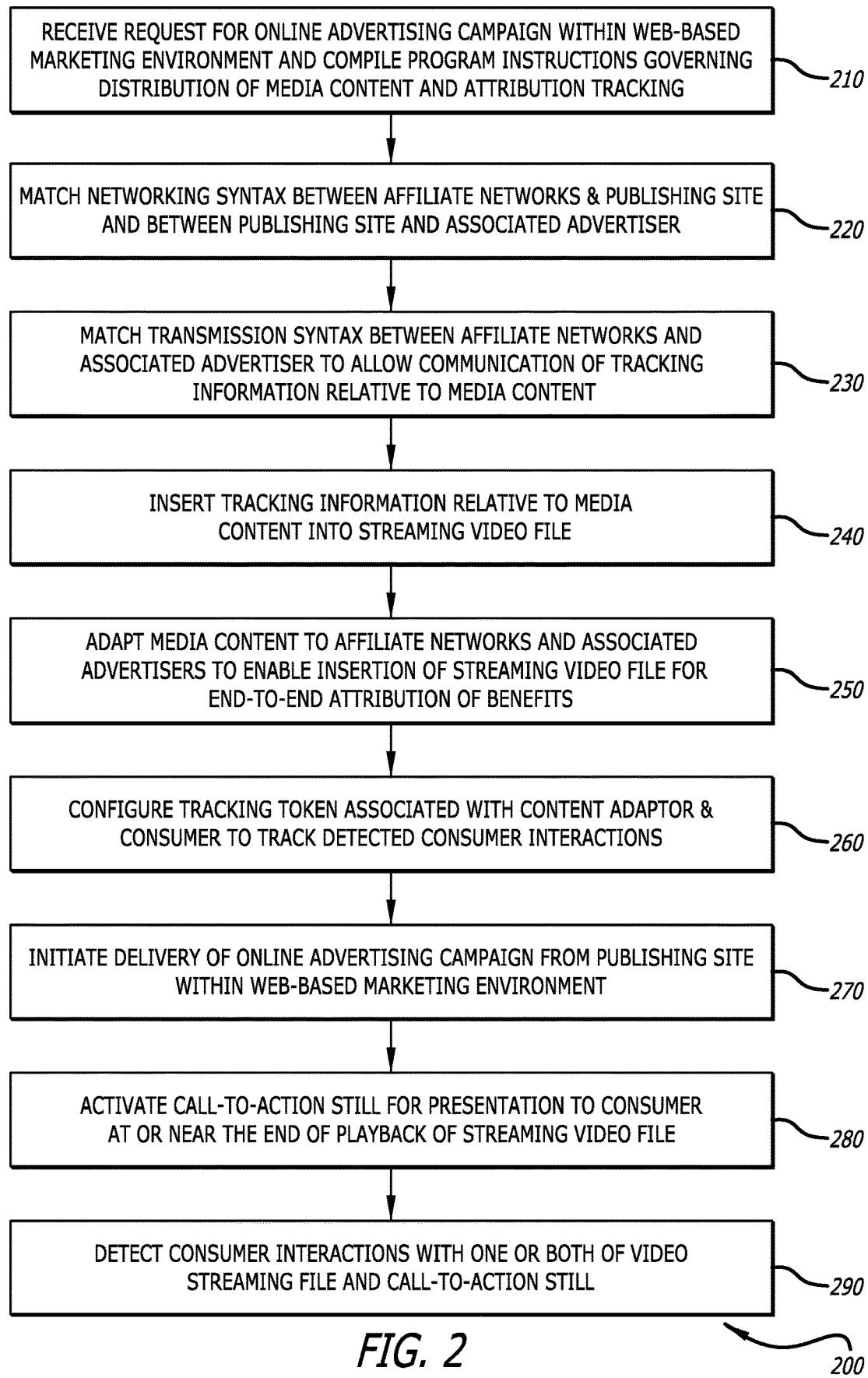
FIG. 2 is a flowchart of steps in a process of performing the online media distribution and tracking framework according to one or more embodiments of the present invention.

FIG. 2 is a flowchart illustrating steps in a process 200 for performing the online media distribution and tracking framework 100, according to one or more embodiments of the present invention. Such a process 200 may include, as noted above one or more functions, mathematical models, algorithms, and data processing techniques for the data processing elements 134 within such a framework 100, and for the various functions of each element 134.

The process 200 is initialized at step 210 upon receipt of a request for an online advertising campaign within the web-based marketing environment comprising the one or more affiliate networks 120, the advertisers 122, and the publisher or publishing site 124. Such a request may serve as input data to the online media distribution and tracking framework 100, and in response to such input data, the present invention begins compiling program instructions that govern a distribution of the media content 102 and associated tracking functions for attributing benefits and rewards throughout the web-based marketing environment and for monitoring consumer interaction with the media content 102.

At step 220, the process 200 executes these program instructions to configure the distribution of the media content 102 generated by the content generation and distribution platform 150 for the web-based marketing environment, by matching a networking syntax between the one or more affiliate networks 120 and the publishing site 124, and between the publishing site 124 and advertisers 122. Such a matching of networking syntax ensures a seamless network integration in which the publisher 124 is capable of communicating with each of the web-based marketing environment, without having to look up and adhere to specific configurations protocols for each instance in which the publisher 124 communicates information with the one or more affiliate networks 120 and the advertisers 122 during an online advertising campaign.

At step 230, the program instructions also match a transmission syntax between the one or more affiliate networks 120 and the advertisers 122 (and any external publishing site 124). This ensures a seamless transmission integration across the web-based marketing environment so that each component thereof is able to talk to the other seamless as information is communicated back and forth. At step 240, program instructions for these tracking elements are inserted into the code for the online advertising campaign, representing tracking information relative to the media content 102 at least for end-to-end benefits attribution. These program instructions also enable a later insertion of tracking information in a consumer identifier comprised at least of a tracking token that is configured to track consumer interactions with one or both of the streaming video 104 and the call-to-action stills 106.

These program instructions also ensure, at step 250, that media content 102 and specifically a file containing streaming video 104 and a call-to-action still 106 are able to be inserted into the online advertising campaign. This is accomplished by creating a content adaptor that enables the file containing the streaming video 104, including the tracking information, is adaptable to each of the hardware and software platforms supporting the one or more affiliate networks 120, the advertisers 122, and the publishers 124. At step 260, the present invention identifies a consumer 126 on whose device the one or more files comprising the online advertising campaign are being viewed, and generates a tracking token as noted above, that is related to both the content adaptor and the consumer identifier for the consumer 126 who accesses the file containing the streaming video 104, and interacts with one or both of the streaming video 104 and call-to-action still 106. Such a tracking token may be any type of instruction or file that anonymously identifies a consumer without including a personal identifiable information (PII).

At steps 270, 280, and 290, the online media distribution and tracking framework 100 displays the online advertising campaign via the content generation and distribution platform 150. This includes initiating delivery of one or more files containing the online advertising campaign from the publisher 124 at step 270. The present invention activates a call-to-action still 106 for presentation to the consumer 126 at or near the end of a playback of the file containing the streaming video 104 at step 280, and detects consumer interactions with one or both of the streaming video 104 and the call-to-action still 106.

The systems and methods for performing the online media distribution and tracking framework 100 of the present invention may be implemented in many different computing environments 130. For example, the online media distribution and t tracking framework 100 may be implemented in conjunction with a special purpose computer, a programmed microprocessor or microcontroller and peripheral integrated circuit element(s), an ASIC or other integrated circuit, a digital signal processor, electronic or logic circuitry such as discrete element circuit, a programmable logic device or gate array such as a PLD, PLA, FPGA, PAL, and any comparable means. In general, any means of implementing the methodology illustrated herein can be used to implement the various aspects of the present invention. Exemplary hardware that can be used for the present invention includes computers, handheld devices, telephones (e.g., cellular, Internet enabled, digital, analog, hybrids, and others), and other such hardware. Some of these devices include processors (e.g., a single or multiple microprocessors), memory, nonvolatile storage, input devices, and output devices. Furthermore, alternative software implementations including, but not limited to, distributed processing, parallel processing, or virtual machine processing can also be configured to perform the methods described herein.

The systems and methods of the present invention may also be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Additionally, the data processing functions disclosed herein may be performed by one or more program instructions stored in or executed by such memory, and further may be performed by one or more modules configured to carry out those program instructions. Modules are intended to refer to any known or later developed hardware, software, firmware, artificial intelligence, fuzzy logic, expert system or combination of hardware and software that is capable of performing the data processing functionality described herein.

Aspects of the present specification may also be described by the following embodiments:

1. A method comprising: initializing, within a content generation and distribution platform, media content at a publishing site for an online advertising campaign that at least includes a streaming video file, wherein the web-based marketing environment is comprised at least of one or more affiliate networks and an associated advertiser; configuring the media content for the web-based marketing environment in a plurality of program instructions generated by the content generation and distribution platform, the plurality of program instructions configured to match a networking syntax at least between the one or more affiliate networks and the publishing site, and between the publishing site and the associated advertiser, and match a transmission syntax between the one or more affiliate networks and the associated advertiser to allow for communication of tracking information relative to the media content between one or more affiliate networks and the associated advertiser; generating a call-to-action still associated with the streaming video file; configuring the streaming video file with the tracking information relative to the media content, the tracking information including a content adaptor to adapt the media content to the one or more affiliate networks and the associated advertiser and enable an end-to-end attribution of benefits relative to a distribution of the media content between the one or more affiliate networks, the publishing site, and the associated advertiser, and tracking of consumer interactions with one or both of the streaming video file and the call-to-action still within the web-based marketing environment, by: associating a consumer viewing the media content with a consumer identifier comprised of at least one tracking token embedded within one or more program instructions and associated with the content adaptor, executing the online advertising campaign, by: directing a display of the online advertising campaign on the publisher site; presenting the call-to-action still to the consumer at or near the end of a playback of the streaming video file; and detecting the consumer's interaction with the one or both of the streaming video file, and the call-to-action still.

2. The method of embodiment 1, further comprising directing the consumer to an advertiser site.

3. The method of embodiment 1 or 2, wherein the content generation and distribution platform communicates a report of consumer interaction with the streaming video file to the associated advertiser.

4. The method of any one of embodiments 1-3, wherein the online advertising campaign is either provided by or requested by the associated advertiser.

5. The method of embodiment 4, wherein where the online advertising campaign is requested by the associated advertiser, the content generation and distribution platform generates the media content and acts as the publishing site within the web-based marketing environment.

6. The method of embodiment 4, wherein where the online advertising campaign is provided by the associated advertiser, the media content is provided to content generation and distribution platform for distribution of the media content to the publishing site and within the web-based marketing environment.

7. The method of any one of embodiments 1-6, wherein the generating a call-to-action still associated with the streaming video file further comprises inserting additional program instructions in the streaming video file to initiate the call-to-action still after a pre-set period of time during which the consumer accessed the media content.
8. The method of any one of embodiments 1-7, wherein the detecting the consumer's interaction with both the video streaming file and the call-to-action still occurs through one or more touch commands or voice commands in connection with a display interface.
9. The method of embodiment 8, wherein the directing the consumer to the advertiser site occurs after the consumer's interaction with the call-to-action still is detected.
10. A method, comprising receiving, as input data, a request to institute an online advertising campaign within a web-based marketing environment comprised of one or more affiliate networks and an associated advertiser, wherein the online advertising campaign including media content initialized within a content generation and distribution platform at a publishing site that at least includes a streaming video file and an associated call-to-action still; compiling a plurality of program instructions governing a distribution of the online advertising campaign within the web-based marketing environment, by: integrating a networking syntax at least between the one or more affiliate networks and the publishing site, and between the publishing site and the associated advertiser, integrating a transmission syntax between the one or more affiliate networks and the associated advertiser to allow for communication of tracking information relative to the media content between one or more affiliate networks and the associated advertiser, and integrating tracking information relative to the media content into the streaming video file, the tracking information including a content adaptor to adapt the media content to the one or more affiliate networks and the associated advertiser and enable an end-to-end attribution of benefits relative to a distribution of the media content between the one or more affiliate networks, the publishing site, and the associated advertiser, and at least one tracking token associated with the content adaptor and configured to track consumer interactions with one or both of the streaming video file and the call-to-action still within the web-based marketing environment by: associating a consumer viewing the media content with a consumer identifier comprised of the at least one tracking token; providing the online advertising campaign to the web-based marketing environment, by: initiating a delivery of the online advertising campaign from the publishing site/within the web-based marketing environment; activating the call-to-action still for presentation to the consumer at or near the end of a playback of the streaming video file; and detecting the consumer's interaction with the one or both of the streaming video file, and the call-to-action still.
11. The method of embodiment 10, further comprising directing the consumer to an advertiser site.
12. The method of embodiment 10 or 11, wherein the content generation and distribution platform communicates a report of consumer interaction with the streaming video file to the associated advertiser.
13. The method of any one of embodiments 10-12, wherein the online advertising campaign is either provided by or requested by the associated advertiser.
14. The method of embodiment 13, wherein where the online advertising campaign is requested by the associated advertiser, the content generation and distribution platform generates the media content and acts as the publishing site within the web-based marketing environment.
15. The method of embodiment 13, wherein where the online advertising campaign is provided by the associated advertiser, the media content is provided to content generation and distribution platform for distribution of the media content to the publishing site and within the web-based marketing environment.
16. The method of any one of embodiments 10-15, further comprising generating the call-to-action still associated with the streaming video file.
17. The method of embodiment 16, wherein the generating a call-to-action still associated with the streaming video file further comprises inserting additional program instructions in the streaming video file to initiate the call-to-action still after a pre-set period of time during which the consumer accessed the media content.
18. The method of any one of embodiments 10-17, wherein the detecting the consumer's interaction with both the video streaming file and the call-to-action still occurs through one or more touch commands or voice commands in connection with a display interface.
19. The method of embodiment 18, wherein the directing the consumer to the advertiser site occurs after the consumer's interaction with the call-to-action still is detected.
20. A system, comprising a campaign generation element configured to initialize an online advertising campaign within a web-based marketing environment comprised of one or more affiliate networks and an associated advertiser, wherein the online advertising campaign including media content initialized within a content generation and distribution platform at a publishing site that at least includes a streaming video file and an associated call-to-action still; a network integration element configured to compile a plurality of program instructions governing a distribution of the online advertising campaign within the web-based marketing environment, the plurality of program instructions configured to: integrate a networking syntax at least between the one or more affiliate networks and the publishing site, and between the publishing site and the associated advertiser, and integrate a transmission syntax between the one or more affiliate networks and the associated advertiser to allow for communication of tracking information relative to the media content between one or more affiliate networks and the associated advertiser; a tracking element configured to insert tracking information relative to the media content into the streaming video file, the tracking information including a content adaptor to adapt the media content to the one or more affiliate networks and the associated advertiser and enable an end-to-end attribution of benefits relative to a distribution of the media content between the one or more affiliate networks, the publishing site, and the associated advertiser, and at least one tracking token associated with the content adaptor and configured to track consumer interactions with one or both of the streaming video file and the call-to-action still within the web-based marketing environment by associating a consumer viewing the media content with a consumer identifier comprised of the at least one tracking token; and a campaign execution element configured to provide the online advertising campaign to the web-based marketing environment, by: initiating a delivery of the online advertising campaign from the publishing site/within the web-based marketing environment; activating the call-to-action still for presentation to the consumer at or near the end of a playback of the streaming video file; and detecting the consumer's interaction with one or both of the streaming video file, and the call-to-action still.

21. The system of embodiment 20, wherein the campaign execution element is further configured to direct the consumer to an advertiser site.

22. The system of embodiment 20 or 21, wherein the content generation and distribution platform communicates a report of consumer interaction with the streaming video file to the associated advertiser.

23. The system of any one of embodiments 20-22, wherein the online advertising campaign is either provided by or requested by the associated advertiser.

24. The system of embodiment 23, wherein where the online advertising campaign is requested by the associated advertiser, the content generation and distribution platform generates the media content and acts as the publishing site within the web-based marketing environment.

25. The system of embodiment 23, wherein where the online advertising campaign is provided by the associated advertiser, the media content is provided to content generation and distribution platform for distribution of the media content to the publishing site and within the web-based marketing environment.

26. The system of any one of embodiments 20-25, wherein the campaign generation element is further configured to generate the call-to-action still associated with the streaming video file.

27. The system of embodiment 26, wherein the campaign generation element is further configured to insert additional program instructions in the streaming video file to initiate the call-to-action still after a pre-set period of time during which the consumer accessed the media content.

28. The system of any one of embodiments 20-27, wherein the consumer's interaction with both the video streaming file and the call-to-action still occurs through one or more touch commands or voice commands in connection with a display interface.

29. The system of embodiment 28, wherein the consumer is directed to the advertiser site after the consumer's interaction with the call-to-action still is detected.

In closing, foregoing descriptions of embodiments of the present invention have been presented for the purposes of illustration and description. It is to be understood that, although aspects of the present invention are highlighted by referring to specific embodiments, one skilled in the art will readily appreciate that these described embodiments are only illustrative of the principles comprising the present invention. As such, the specific embodiments are not intended to be exhaustive or to limit the invention to the precise forms disclosed. Therefore, it should be understood that embodiments of the disclosed subject matter are in no way limited to a particular element, compound, composition, component, article, apparatus, methodology, use, protocol, step, and/or limitation described herein, unless expressly stated as such.

In addition, groupings of alternative embodiments, elements, steps and/or limitations of the present invention are not to be construed as limitations. Each such grouping may be referred to and claimed individually or in any combination with other groupings disclosed herein. It is anticipated that one or more alternative embodiments, elements, steps and/or limitations of a grouping may be included in, or deleted from, the grouping for reasons of convenience and/or patentability. When any such inclusion or deletion occurs, the specification is deemed to contain the grouping as modified, thus fulfilling the written description of all Markush groups used in the appended claims.

Furthermore, those of ordinary skill in the art will recognize that certain changes, modifications, permutations, alterations, additions, subtractions and sub-combinations thereof can be made in accordance with the teachings herein without departing from the spirit of the present invention. Furthermore, it is intended that the following appended claims and claims hereafter introduced are interpreted to include all such changes, modifications, permutations, alterations, additions, subtractions and sub-combinations as are within their true spirit and scope. Accordingly, the scope of the present invention is not to be limited to that precisely as shown and described by this specification.

Certain embodiments of the present invention are described herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the present invention to be practiced otherwise than specifically described herein. Accordingly, this invention includes all modifications and equivalents of the subject matter recited in the claims appended hereto as permitted by applicable law. Moreover, any combination of the above-described embodiments in all possible variations thereof is encompassed by the invention unless otherwise indicated herein or otherwise clearly contradicted by context.

The words, language, and terminology used in this specification is for the purpose of describing particular embodiments, elements, steps and/or limitations only and is not intended to limit the scope of the present invention, which is defined solely by the claims. In addition, such words, language, and terminology are to be understood not only in the sense of their commonly defined meanings, but to include by special definition in this specification structure, material or acts beyond the scope of the commonly defined meanings. Thus, if an element, step or limitation can be understood in the context of this specification as including more than one meaning, then its use in a claim must be understood as being generic to all possible meanings supported by the specification and by the word itself.

The definitions and meanings of the elements, steps or limitations recited in a claim set forth below are, therefore, defined in this specification to include not only the combination of elements, steps or limitations which are literally set forth, but all equivalent structure, material or acts for performing substantially the same function in substantially the same way to obtain substantially the same result. In this sense it is therefore contemplated that an equivalent substitution of two or more elements, steps or limitations may be made for any one of the elements, steps or limitations in a claim set forth below or that a single element, step or limitation may be substituted for two or more elements, steps or limitations in such a claim. Although elements, steps or limitations may be described above as acting in certain combinations and even initially claimed as such, it is to be expressly understood that one or more elements, steps or limitations from a claimed combination can in some cases be excised from the combination and that the claimed combination may be directed to a sub-combination or variation of a sub-combination. As such, notwithstanding the fact that the elements, steps and/or limitations of a claim are set forth below in a certain combination, it must be expressly understood that the invention includes other combinations of fewer, more or different elements, steps and/or limitations, which are disclosed in above even when not initially claimed in such combinations. Furthermore, insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements. Accordingly, the claims are thus to be understood to include what is specifically illustrated and described above, what is conceptually equivalent, what can be obviously substituted and also what essentially incorporates the essential idea of the invention.

Unless otherwise indicated, all numbers expressing a characteristic, item, quantity, parameter, property, term, and so forth used in the present specification and claims are to be understood as being modified in all instances by the term "about." As used herein, the term "about" means that the characteristic, item, quantity, parameter, property, or term so qualified encompasses a range of plus or minus ten percent above and below the value of the stated characteristic, item, quantity, parameter, property, or term. Accordingly, unless indicated to the contrary, the numerical parameters set forth in the specification and attached claims are approximations that may vary. For instance, as mass spectrometry instruments can vary slightly in determining the mass of a given analyte, the term "about" in the context of the mass of an ion or the mass/charge ratio of an ion refers to +/−0.50 atomic mass unit. At the very least, and not as an attempt to limit the application of the doctrine of equivalents to the scope of the claims, each numerical indication should at least be construed in light of the number of reported significant digits and by applying ordinary rounding techniques.

Notwithstanding that the numerical ranges and values setting forth the broad scope of the invention are approximations, the numerical ranges and values set forth in the specific examples are reported as precisely as possible. Any numerical range or value, however, inherently contains certain errors necessarily resulting from the standard deviation found in their respective testing measurements. Recitation of numerical ranges of values herein is merely intended to serve as a shorthand method of referring individually to each separate numerical value falling within the range. Unless otherwise indicated herein, each individual value of a numerical range is incorporated into the present specification as if it were individually recited herein.

Use of the terms "may" or "can" in reference to an embodiment or aspect of an embodiment also carries with it the alternative meaning of "may not" or "cannot." As such, if the present specification discloses that an embodiment or an aspect of an embodiment may be or can be included as part of the inventive subject matter, then the negative limitation or exclusionary proviso is also explicitly meant, meaning that an embodiment or an aspect of an embodiment may not be or cannot be included as part of the inventive subject matter. In a similar manner, use of the term "optionally" in reference to an embodiment or aspect of an embodiment means that such embodiment or aspect of the embodiment may be included as part of the inventive subject matter or may not be included as part of the inventive subject matter. Whether such a negative limitation or exclusionary proviso applies will be based on whether the negative limitation or exclusionary proviso is recited in the claimed subject matter.

The terms "a," "an," "the" and similar references used in the context of describing the present invention (especially in the context of the following claims) are to be construed to cover both the singular and the plural, unless otherwise indicated herein or clearly contradicted by context. Further, ordinal indicators—such as, e.g., "first," "second," "third," etc.—for identified elements are used to distinguish between the elements, and do not indicate or imply a required or limited number of such elements, and do not indicate a particular position or order of such elements unless otherwise specifically stated. All methods described herein can be performed in any suitable order unless otherwise indicated herein or otherwise clearly contradicted by context. The use of any and all examples or exemplary language (e.g., "such as") provided herein is intended merely to better illuminate the present invention and does not pose a limitation on the scope of the invention otherwise claimed. No language in the present specification should be construed as indicating any non-claimed element essential to the practice of the invention.

When used in the claims, whether as filed or added per amendment, the open-ended transitional term "comprising", variations thereof such as, e.g., "comprise" and "comprises", and equivalent open-ended transitional phrases thereof like "including," "containing" and "having", encompass all the expressly recited elements, limitations, steps, integers, and/or features alone or in combination with unrecited subject matter; the named elements, limitations, steps, integers, and/or features are essential, but other unnamed elements, limitations, steps, integers, and/or features may be added and still form a construct within the scope of the claim. Specific embodiments disclosed herein may be further limited in the claims using the closed-ended transitional phrases "consisting of" or "consisting essentially of" (or variations thereof such as, e.g., "consist of", "consists of", "consist essentially of", and "consists essentially of") in lieu of or as an amendment for "comprising." When used in the claims, whether as filed or added per amendment, the closed-ended transitional phrase "consisting of" excludes any element, limitation, step, integer, or feature not expressly recited in the claims. The closed-ended transitional phrase "consisting essentially of" limits the scope of a claim to the expressly recited elements, limitations, steps, integers, and/or features and any other elements, limitations, steps, integers, and/or features that do not materially affect the basic and novel characteristic(s) of the claimed subject matter. Thus, the meaning of the open-ended transitional phrase "comprising" is being defined as encompassing all the specifically recited elements, limitations, steps and/or features as well as any optional, additional unspecified ones. The meaning of the closed-ended transitional phrase "consisting of" is being defined as only including those elements, limitations, steps, integers, and/or features specifically recited in the claim, whereas the meaning of the closed-ended transitional phrase "consisting essentially of" is being defined as only including those elements, limitations, steps, integers, and/or features specifically recited in the claim and those elements, limitations, steps, integers, and/or features that do not materially affect the basic and novel characteristic(s) of the claimed subject matter. Therefore, the open-ended transitional phrase "comprising" (and equivalent open-ended transitional phrases thereof) includes within its meaning, as a limiting case, claimed subject matter specified by the closed-ended transitional phrases "consisting of" or "consisting essentially of." As such, the embodiments described herein or so claimed with the phrase "comprising" expressly and unambiguously provide description, enablement, and support for the phrases "consisting essentially of" and "consisting of."

Lastly, all patents, patent publications, and other references cited and identified in the present specification are individually and expressly incorporated herein by reference in their entirety for the purpose of describing and disclosing, for example, the compositions and methodologies described in such publications that might be used in connection with the present invention. These publications are provided solely for their disclosure prior to the filing date of the present application. Nothing in this regard is or should be construed as an admission that the inventors are not entitled to antedate such disclosure by virtue of prior invention or for any other reason. All statements as to the date or representation as to the contents of these documents are based on the information available to the applicant and do not constitute any admission as to the correctness of the dates or contents of these documents.

The invention claimed is:

1. A method comprising: initializing, within a content generation and distribution platform, media content at a publishing site for an online advertising campaign that at least includes a streaming video file, wherein the web-based marketing environment is comprised at least of one or more affiliate networks and an associated advertiser; configuring the media content for the web-based marketing environment in a plurality of program instructions generated by the content generation and distribution platform, the plurality of program instructions configured to: identify and integrate a common networking syntax at least between the one or more affiliate networks and the publishing site, and between the publishing site and the associated advertiser, and identify and integrate a common a transmission syntax between the one or more affiliate networks and the associated advertiser to allow for communication of tracking information relative to the media content between one or more affiliate networks and the associated advertiser; uploading a call-to-action still associated with the streaming video file from the associated advertiser according to the common networking syntax and the common transmission syntax; configuring the streaming video file with the tracking information relative to the media content, the tracking information including a content adaptor to adapt the media content to the one or more affiliate networks and the associated advertiser and enable an end-to-end attribution of benefits relative to a distribution of the media content between the one or more affiliate networks, the publishing site, and the associated advertiser, and tracking of consumer interactions with one or both of the streaming video file and the call-to-action still within the web-based marketing environment, by associating a consumer viewing the media content with a consumer identifier comprised of at least one tracking token embedded within one or more program instructions and associated with the content adaptor; executing the online advertising campaign, by: displaying of the online advertising campaign on the publisher site, presenting the call-to-action still to the consumer at or near the end of a playback of the streaming video file, and detecting the consumer's interaction with the one or both of the streaming video file, and the call-to-action still wherein the consumer interacts with the call-to-action still by one or more of a mouse click, a voice command, a touch command, or a keyboard command, and further wherein a transfer of the consumer to an external e-commerce site of the associated advertiser is actuated according to the common networking syntax and the common transmission syntax after the consumer interacts with the call-to-action still.

2. The method of claim 1, wherein the transfer of the consumer to an external e-commerce site of the associated advertiser further comprises automatically sending the consumer to an advertiser site outside of the content generation and distribution platform that includes the external e-commerce site.

3. The method of claim 1, wherein the online advertising campaign is either provided by or requested by the associated advertiser.

4. The method of claim 3, wherein where the online advertising campaign is requested by the associated advertiser, the content generation and distribution platform generates the media content within the web-based marketing environment.

5. The method of claim 3, wherein where the online advertising campaign is provided by the associated advertiser, the media content is provided to the content generation and distribution platform for distribution of the media content within the web-based marketing environment.

6. The method of claim 1, wherein the generating a call-to-action still associated with the streaming video file further comprises inserting additional program instructions in the streaming video file to initiate the call-to-action still after a pre-set period of time during which the consumer accessed the media content, and wherein the detecting the consumer's interaction with both the video streaming file and the call-to-action still occurs through one or more touch commands or voice commands in connection with a display interface.

7. A method, comprising receiving, as input data, a request to institute an online advertising campaign within a web-based marketing environment comprised of one or more affiliate networks and an associated advertiser, wherein the online advertising campaign including media content initialized within a content generation and distribution platform at a publishing site that at least includes a streaming video file and a call-to-action still associated with the streaming video file compiling a plurality of program instructions governing a distribution of the online advertising campaign within the web-based marketing environment, by: identifying and integrating a common networking syntax at least between the one or more affiliate networks and the publishing site, and between the publishing site and the associated advertiser, identifying and integrating a common transmission syntax between the one or more affiliate networks and the associated advertiser to allow for communication of tracking information relative to the media content between one or more affiliate networks and the associated advertiser, and integrating tracking information relative to the media content into the streaming video file, the tracking information including a content adaptor to adapt the media content to the one or more affiliate networks and the associated advertiser and enable an end-to-end to attribution of benefits relative to a distribution of the media content between the one or more affiliate networks, the publishing site, and the associated advertiser, and at least one tracking token associated with the content adaptor and configured to track consumer interactions with one or both of the streaming video file and the call-to-action still within the web-based marketing environment by associating a consumer viewing the media content with a consumer identifier comprised of the at least one tracking token; providing the online advertising campaign to the web-based marketing environment, by: delivering the online advertising campaign from the publishing site/within the web-based marketing environment, activating the associated call-to-action still for presentation to the consumer at or near the end of a playback of the streaming video file, wherein the call-to-action still is uploaded from the associated advertiser, and correlated with the streaming video file, according to the common networking syntax and the common transmission syntax, and detecting the consumer's interaction with the one or both of the streaming video file, and the call-to-action still wherein the consumer interacts with the call-to-action still by one or more of a mouse click, a voice command, a touch command, or a keyboard command, and further wherein a transfer of the consumer to an external e-commerce site of the associated advertiser is actuated according to the common networking syntax and the common transmission syntax after the consumer interacts with the call-to-action still.

8. The method of claim 7, wherein the transfer of the consumer to an external e-commerce site of the associated advertiser further comprises automatically sending the consumer to an advertiser site outside of the content generation and distribution platform that includes the external e-commerce site.

9. The method of claim 7, wherein the online advertising campaign is either provided by or requested by the associated advertiser.

10. The method of claim 9, wherein the online advertising campaign is requested by the associated advertiser, the content generation and distribution platform generates the media content within the web-based marketing environment.

11. The method of claim 9, wherein the online advertising campaign is provided by the associated advertiser, the media content is provided to the content generation and distribution platform for distribution of the media content within the web-based marketing environment.

12. The method of claim 7, further comprising generating the call-to-action still associated with the streaming video file.

13. The method of claim 12, wherein the generating a call-to-action still associated with the streaming video file further comprises inserting additional program instructions in the streaming video file to initiate the call-to-action still after a pre-set period of time during which the consumer accessed the media content, and wherein the detecting the consumer's interaction with both the video streaming file and the call-to-action still occurs through one or more touch commands or voice commands in connection with a display interface.

14. A system comprising: at least one computer-readable non-transitory storage medium; one or more processors in communication with the at least one computer-readable non-transitory storage medium, the one or more processors being configured to: initialize an online advertising campaign within a web-based marketing environment comprised of one or more affiliate networks and an associated advertiser, wherein the online advertising campaign including media content initialized within a content generation and distribution platform at a publishing site that at least includes a streaming video file and a call-to-action still associated with the streaming video file; compile a plurality of program instructions governing a distribution of the online advertising campaign within the web-based marketing environment, the plurality of program instructions configured to: identify and integrate a common networking syntax at least between the one or more affiliate networks and the publishing site, and between the publishing site and the associated advertiser, and identify and integrate a common transmission syntax between the one or more affiliate networks and the associated advertiser to allow for communication of tracking information relative to the media content between one or more affiliate networks and the associated advertiser; insert tracking information relative to the media content into the streaming video file, the tracking information including a content adaptor to adapt the media content to the one or more affiliate networks and the associated advertiser and enable an end-to-end attribution of benefits relative to a distribution of the media content between the one or more affiliate networks, the publishing site, and the associated advertiser, and at least one tracking token associated with the content adaptor and configured to track consumer interactions with one or both of the streaming video file and the call-to-action still within the web-based marketing environment by associating a consumer viewing the media content with a consumer identifier comprised of the at least one tracking token; and provide the online advertising campaign to the web-based marketing environment, by: delivering the online advertising campaign from the publishing site/within the web-based marketing environment, activating the call-to-action still for presentation to the consumer at or near the end of a playback of the streaming video file, wherein the call-to-action still is uploaded from the associated advertiser, and correlated with the streaming video file, according to the common networking syntax and the common transmission syntax, and detecting the consumer's interaction with one or both of the streaming video file, and the call-to-action still, wherein the consumer interacts with the call-to-action still by one or more of a mouse click, a voice command, a touch command, or a keyboard command, and further wherein a transfer of the consumer to an external e-commerce site of the associated advertiser is actuated according to the common networking syntax and the common transmission syntax after the consumer interacts with the call-to-action still.

15. The system of claim 14, wherein the transfer of the consumer to an external e-commerce site of the associated advertiser further comprises automatically sending the consumer to the external e-commerce site outside of the content generation and distribution platform.

16. The system of claim 14, wherein the online advertising campaign is either provided by or requested by the associated advertiser.

17. The system of claim 16, wherein the online advertising campaign is requested by the associated advertiser, the content generation and distribution platform generates the media content within the web-based marketing environment.

18. The system of claim 16, wherein the online advertising campaign is provided by the associated advertiser, the media content is provided to the content generation and distribution platform for distribution of the media content within the web-based marketing environment.

19. The system of claim 14, wherein the campaign generation element is further configured to generate the call-to-action still associated with the streaming video file.

20. The system of claim 19, wherein the campaign generation element is further configured to insert additional program instructions in the streaming video file to initiate the call-to-action still after a pre-set period of time during which the consumer accessed the media content, and wherein the consumer's interaction with both the video streaming file and the call-to-action still occurs through one or more touch commands or voice commands in connection with a display interface.

* * * * *